(12) United States Patent
Jang et al.

(10) Patent No.: US 10,773,728 B2
(45) Date of Patent: Sep. 15, 2020

(54) SIGNAL PROCESSING SYSTEM AND SIGNAL PROCESSING METHOD FOR SENSORS OF VEHICLE

(71) Applicant: COAVIS, Sejong-si (KR)

(72) Inventors: Young Sub Jang, Sejong-si (KR); In Seok Sohn, Cheongju-si (KR)

(73) Assignee: COAVIS, Sejong-si (KR)

( * ) Notice: Subject to any disclaimer, the term of this patent is extended or adjusted under 35 U.S.C. 154(b) by 304 days.

(21) Appl. No.: 15/927,060

(22) Filed: Mar. 20, 2018

(65) Prior Publication Data

US 2019/0092339 A1 Mar. 28, 2019

(30) Foreign Application Priority Data

Mar. 20, 2017 (KR) .......................... 10-2017-0034343

(51) Int. Cl.
*G01M 17/00* (2006.01)
*G06F 7/00* (2006.01)
(Continued)

(52) U.S. Cl.
CPC ..... *B60W 50/0205* (2013.01); *G06F 16/2358* (2019.01); *G07C 5/08* (2013.01);
(Continued)

(58) Field of Classification Search
CPC ...... B60W 50/0205; B60W 2050/0215; G07C 5/08; G07C 5/0825; G07C 5/085;
(Continued)

(56) References Cited

U.S. PATENT DOCUMENTS

| 6,738,514 B1* | 5/2004 | Shin ...................... G06F 3/0488 |
| | | 382/187 |
| 2012/0310474 A1* | 12/2012 | Sakakibara ............ G07C 5/085 |
| | | 701/33.4 |

(Continued)

FOREIGN PATENT DOCUMENTS

| KR | 10-0812022 | 3/2008 |
| KR | 10-1150626 | 6/2012 |

*Primary Examiner* — Harry Y Oh
*Assistant Examiner* — Sohana Tanju Khayer
(74) *Attorney, Agent, or Firm* — Hauptman Ham, LLP

(57) ABSTRACT

Provided are a signal processing system and a signal processing method for sensors of a vehicle. More particularly, the signal processing system includes: a vehicle sensor unit 100 including the plurality of sensors previously provided in the vehicle and transmitting sensing information acquired through the sensors; an arithmetic and control unit 200 receiving sensing information from the vehicle sensor unit 100, and comparing and analyzing the received sensing information to discriminate only normal sensing information from the sensing information and set and transmit the normal sensing information as output information; and a display unit 300 including a plurality of displays previously provided in the vehicle, transmitting the output information received from the arithmetic and control unit 200 to the matched display of the plurality of displays, and outputting the output information through the matched display of the plurality of displays.

4 Claims, 3 Drawing Sheets

(51) Int. Cl.
*G06F 11/30* (2006.01)
*G06F 19/00* (2018.01)
*G07C 5/00* (2006.01)
*B60W 50/02* (2012.01)
*G07C 5/08* (2006.01)
*G06F 16/23* (2019.01)

(52) U.S. Cl.
CPC .......... *G07C 5/085* (2013.01); *G07C 5/0825* (2013.01); *B60W 2050/0215* (2013.01)

(58) Field of Classification Search
CPC .............. G07C 5/0808; G06F 16/2358; B60Y 2400/30; B60R 16/0232; B60R 16/0231; B60R 16/023
See application file for complete search history.

(56) References Cited

U.S. PATENT DOCUMENTS

| | | | |
|---|---|---|---|
| 2013/0024046 A1* | 1/2013 | Toriya | H02J 5/005 700/297 |
| 2013/0106596 A1* | 5/2013 | Mouchet | B60C 23/0472 340/445 |
| 2016/0112216 A1* | 4/2016 | Sargent | H04L 12/66 370/328 |

* cited by examiner a) INPUT FIRST SENSING INFORMATION OR ADDITIONAL SENSING INFORMATION b) INPUT REDUNDANT SENSING INFORMATION

SIGNAL PROCESSING SYSTEM AND SIGNAL PROCESSING METHOD FOR SENSORS OF VEHICLE

CROSS-REFERENCE TO RELATED APPLICATIONS

This application claims priority under 35 U.S.C. § 119 to Korean Patent Application No. 10-2017-0034343, filed on Mar. 20, 2017, in the Korean Intellectual Property Office, the disclosure of which is incorporated herein by reference in its entirety.

TECHNICAL FIELD

The following disclosure relates to a signal processing system and a signal processing method for sensors of a vehicle, and more particularly, to a signal processing system and a signal processing method for sensors of a vehicle capable of discriminating a noise signal with high accuracy within a short period of time by comparing and analyzing sensing information input from sensors in the vehicle, thereby effectively increasing integrity and accuracy of the information output in the vehicle.

BACKGROUND

In order to detect an error (noise) for sensing information input through a plurality of sensors provided in the vehicle, typically, only when sensing information having the specific value equal to or more than a preset reference value (for example, reference number) among the sensing information continuously input by a preset number is input, the sensing information having a specific measurement value is determined as a normal signal and when sensing information having different measurement values in the middle of the sensing information continuously input by a preset number is input, all the corresponding sensing information is determined as an error (noise) and thus sensing information continued by a preset number is newly input.

Therefore, when the error (noise) is detected by the above-described method, a re-detection can be made only when the sensing information corresponding to the sensing information continuously input by the preset number is newly input, such that it is inevitable that the information update becomes slow as much.

Korean Patent No. 10-1150626 ("Signal processing apparatus for processing and providing sensor signals", hereinafter referred to as Related Art Document 1) discloses a signal processing apparatus for receiving each of sensor signals generated from various sensors equipped in a vehicle, converting the received sensor signals into data for controlling a system, and providing the data to one or more electronic control system for a vehicle.

However, the related art document 1 does not mention the error (noise) detection at all.

RELATED ART DOCUMENT

Patent Document

Korean Patent No. 10-1150626 (Registration Date: May 21, 2012)

SUMMARY

An embodiment of the present disclosure is directed to providing a signal processing system and a signal processing method for sensors of a vehicle capable of discriminating a noise signal with high accuracy within a short period of time by comparing and analyzing sensing information input from the sensors provided in the vehicle, thereby effectively increasing integrity and accuracy of information output in the vehicle.

In one general aspect, a signal processing system for sensors of a vehicle includes: a vehicle sensor unit 100 including the plurality of sensors previously provided in the vehicle and transmitting sensing information acquired through the sensors; an arithmetic and control unit 200 receiving sensing information for each sensor from the vehicle sensor unit 100, and comparing and analyzing the received sensing information to discriminate only normal sensing information from the sensing information and set and transmit the normal sensing information as output information; and a display unit 300 including a plurality of monitoring means previously provided in the vehicle, transmitting the output information received from the arithmetic and control unit 200 to the matched monitoring means, and outputting the output information through the monitoring means. The arithmetic and control unit 200 includes a computer, a processing or processor-based system, a multiprocessor, a distributed processing system, an application specific integrated circuit (ASIC), and/or the like for executing one or more instructions. The monitoring means includes a monitor, display, and/or the like and includes one or more devices for displaying information and/or images to a user.

The vehicle sensor unit 100 may acquire the sensing information for each sensor every a preset time, and transmit the sensing information to the arithmetic and control unit 200 by a preset number of times or continuously.

The arithmetic and control unit 200 may include: an information input unit 210 receiving the sensing information for each sensor from the vehicle sensor unit 100; a comparison and arithmetic unit 220 determining whether there is the previously input sensing information if the sensing information is input through the information input unit 210, and immediately transmitting the sensing information to the storage unit 230 if the sensing information is first sensing information without previously input sensing information; a storage unit 230 including a plurality of memory means and storing first sensing information in one memory means if the first sensing information is transmitted through the comparison and arithmetic unit 220; a counter unit 240 counting the number of sensing information stored in each of the memory means; and an information output unit 250 setting and transmitting the sensing information stored in the corresponding memory means if the number of sensing information stored in each of the memory means counted by the counter unit 240 reaches a preset number. The memory means includes an electronic, magnetic, optical, electromagnetic, or semiconductor memory or system, and/or the like for storing information and/or data. For example, the memory includes a semiconductor or solid-state memory, a magnetic tape, a removable computer diskette, a random access memory (RAM), a read-only memory (ROM), a rigid magnetic disk, an optical disk and/or the like. The storage unit includes one or more memories. The counter unit includes an electronic, or mechanical counter. For example, one or more integrated circuits, flip-flops, or software counters. The information input unit includes a wired and/or wireless interface for receiving input information and/or data. For example, information input unit includes wireless network interfaces such as BLUETOOTH, WIFI, WIMAX, GPRS, or WCDMA; or wired network interfaces such as ETHERNET, USB, or IEEE-1364. Information input unit includes serial or parallel interfaces. The information output unit includes a wired and/or wireless interface for transmitting output information and/or data. For example, information output unit includes wireless network interfaces such as BLUETOOTH, WIFI, WIMAX, GPRS, or WCDMA; or wired network interfaces such as ETHERNET, USB, or IEEE-1364. Information output unit includes serial or parallel interfaces.

The comparison and arithmetic unit 220 may determine whether there is previously input sensing information if the sensing information is input through the information input unit 210, compare and analyze whether newly input sensing information matches the previously input sensing information if it is determined that there is the previously input sensing information, and immediately transmit the sensing information to the storage unit 230 if there is the sensing information matching the newly input sensing information among the previously input sensing information, and the storage unit 230 may store the newly input sensing information in the memory means in which the previously input sensing information matching the newly input sensing information is stored.

The comparison and arithmetic unit 220 may determine whether there is previously input sensing information if the sensing information is input through the information input unit 210, compare and analyze whether newly input sensing information matches the previously input sensing information if it is determined that there is the previously input sensing information, and immediately transmit the sensing information to the storage unit 230 if there is no sensing information matching the newly input sensing information among the previously input sensing information, and the storage unit 230 may store the newly input sensing information in a new memory means.

The comparison and arithmetic unit 220 may compare and analyze whether the newly input sensing information matches the previously input sensing information by applying a preset error range.

The arithmetic and control unit 200 may control the storage unit 230 if specific sensing information is set as output information and transmitted through the information output unit 250 to reset the remaining memory means other than the memory means in which the specific sensing information set as the output information is stored.

In another general aspect, a signal processing method for sensors of a vehicle includes: a sensing step (S100) of acquiring, by a vehicle sensor unit, sensing information through a plurality of sensors previously provided in the vehicle and transmitting the acquired sensing information to an arithmetic and control unit; an error detection step (S200) of comparing and analyzing, by the arithmetic and control unit 200, the sensing information received for each sensor in the sensing step (S100) to discriminate only normal sensing information from the sensing information, setting the discriminated normal sensing information as output information, and transmitting the set output information to a display unit; and a display step (S300) of transmitting, by the display unit, the output information received in the error detection step (S200) to a matched monitoring means among a plurality of monitoring means previously provided in the vehicle and outputting the output information.

The error detection step (S200) may include: an input step (S210) of inputting the sensing information for each sensor in the sensing step (S100); a first determination step (S220) of determining whether there is previously input sensing information if the sensing information is input in the input step (S210); a first storage step (S230) of storing the sensing information in one memory means if it is determined as the determination result of the first determination step (S220) that the sensing information is determined as first sensing information; a second determination step (S240) of comparing and analyzing whether the sensing information matches the previously input sensing information if it is determined as the determination result of the first determination step (S220) that there is the previously input sensing information; a second storage step (S250) of storing newly input sensing information in the memory means in which the previously sensing information matching the newly input sensing information is stored if it is determined as the determination result of the second determination step (S240) that there is the sensing information matching the newly input sensing information among the previously input sensing information; a third storage step (S260) of storing newly input sensing information in a new memory means if it is determined as the determination result of the second determination step (S240) that there is no sensing information matching the newly input sensing information among the previously input sensing information; a count step (S270) of counting the number of sensing information stored in each memory means in the first storage step (S230), the second storage step (S250), and the third storage step (S260); and an output step (S280) of setting and transmitting sensing information stored in the corresponding memory means if the number of sensing information stored in each of the memory means counted in the count step (S270) reaches a preset number.

In the second determination step (S240), it may be compared and analyzed whether the newly input sensing information matches the previously input sensing information by applying a preset error range.

If the specific sensing information is set as the output information in the output step S280 and is transmitted, the remaining memory means other than the memory means in which the specific sensing information set as the output information is stored may be reset.

Other features and aspects will be apparent from the following detailed description, the drawings, and the claims.

DETAILED DESCRIPTION OF MAIN ELEMENTS

Figure 1:
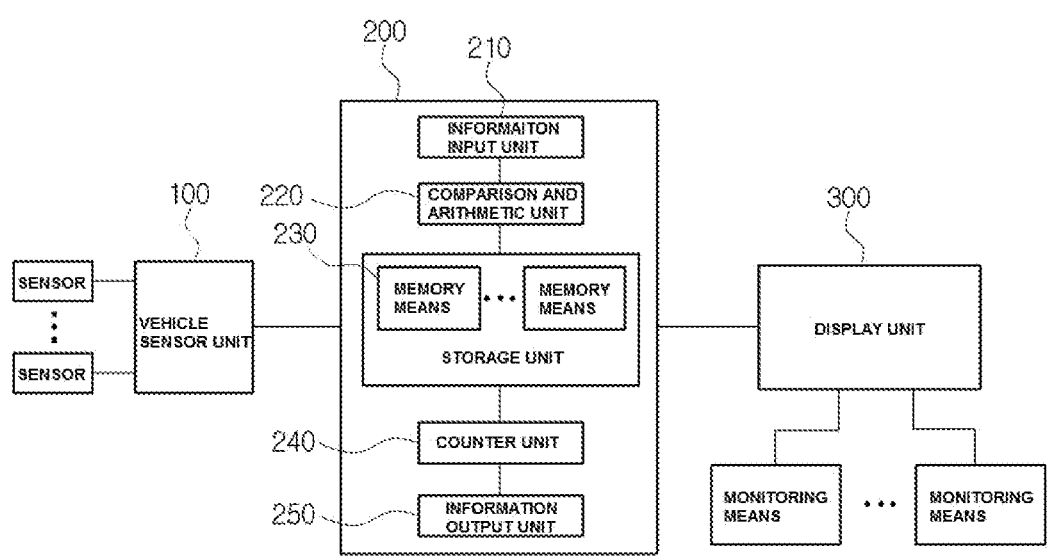
FIG. 1 is a diagram illustrating a signal processing system for sensors of a vehicle according to an exemplary embodiment of the present invention.

100: Vehicle sensor unit
200: Arithmetic and control unit
210: Information input unit
220: Comparison and arithmetic unit
230: Storage unit
240: Counter unit
250: Information output unit
300: Display unit

DETAILED DESCRIPTION OF EMBODIMENTS

Hereinafter, a signal processing system and a signal processing method for sensors of a vehicle according to an exemplary embodiment of the present invention will be described in detail with reference to the accompanying drawings. The following introduced drawings are provided by way of example so that the idea of the present invention can be sufficiently transferred to those skilled in the art to which the present invention pertains. Therefore, the present invention is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

In addition, the system means a set of components including apparatuses, mechanisms, units, etc. which are organized and regularly interact with each other to perform required functions.

A signal processing system and a signal processing method for sensors of a vehicle according to an exemplary embodiment of the present invention effectively compares and analyzes input signals (sensing information) to increase integrity and accuracy of the signals which are input through the sensors for the vehicle and output to a driver (user, manager), thereby discriminating noise (error) signals with high accuracy within a short discrimination time and effectively outputting normal signals.

FIG. 1 is a configuration diagram illustrating a signal processing system for sensors of a vehicle according to an exemplary embodiment of the present invention. The signal processing system for sensors of a vehicle according to the exemplary embodiment of the present invention will be described in detail with reference to FIG. 1.

The signal processing system for sensors of a vehicle according to an exemplary embodiment of the present invention may include a vehicle sensor unit 100 including a plurality of sensors previously installed in the vehicle, an arithmetic and control unit 200 receiving sensing information from the vehicle sensor unit 100, and a display unit 300 including a plurality of monitoring means previously provided in the vehicle, in which the vehicle sensor unit 100, the arithmetic and control unit 200, and the display unit 300 preferably transmit/receive information data based on vehicle communication.

Generally, for the vehicle communication, any of CAN, LIN, PWM, SENT, or the like may be used.

At this time, the vehicle sensor unit 100 preferably includes a plurality of sensors provided at various positions in the vehicle.

Preferably, the arithmetic and control unit 200 is preferably mapped to an electronic control unit (ECU) previously provided in the vehicle to collect sensing information.

Also, the display unit 300 may include a plurality of monitoring means (instrument panel, cluster, control panel board, center fascia, or the like) provided at various positions in the vehicle.

Each component will be described in detail.

As described above, the vehicle sensor unit 100 includes a plurality of sensors previously provided in the vehicle, and may transmit sensing information acquired through the sensors to the arithmetic and control unit 200.

At this time, the vehicle sensor unit 100 may acquire the sensing information for each sensor every a preset time, and transmit the acquired sensing information to the arithmetic and control unit 200 by a preset number of times or continuously.

For example, when comparing a fuel level with a washer fluid level, if the fuel level updates information later than the washer fluid level, there is a high risk of fatal defects in the vehicle. Therefore, it is preferable that the sensing information is acquired more frequently than a frequency of sensing the washer fluid level. It is preferable that the preset time and the preset number of times are set in advance at the time of designing the vehicle; however, the preset time and the preset number of times can be changed depending on a driver's demand.

The arithmetic and control unit 200 receives the sensing information for each sensor from the vehicle sensor unit 100. Since most of control conditions, such as a monitoring unit from which the sensing information is output, an output unit, an update reference and an update interval, are different for each sensor, the sensing information for each sensor is separately received.

The arithmetic and control unit 200 may compare and analyze the received sensing information, discriminate only normal sensing information among the sensing information, and set the discriminated normal sensing information as output information and output it.

A detailed configuration of the arithmetic and control unit 200 will be described later in detail.

The display unit 300 may include a plurality of monitoring means previously provided in the vehicle, and transmit the output information received from the arithmetic and control unit 200 to the matched monitoring means and output the output information through the monitoring means, such that the driver (user, manager) can quickly check the in-vehicle state.

For example, if the output information received from the arithmetic and control unit 200 is fuel level information, as the matched monitoring means, a fuel gauge of a main cluster is preferably used, and if the output information is external temperature information, as the matched monitoring means, the center fascia which is the control panel portion or an outside display portion of a cluster is preferably used.

As illustrated in FIG. 1, the arithmetic and control unit 200 may be configured to include an information input unit 210, a comparison and arithmetic unit 220, a storage unit 230, a counter unit 240, and an information output unit 250.

The information input unit 210 receives the sensing information for each sensor from the vehicle sensor unit 100. As described above, the information input unit 210 separately receives the sensing information for each sensor.

If the sensing information is input through the information input unit 210, the comparison and arithmetic unit 220 preferentially determines whether there is sensing information previously input before the sensing information.

According to the determination result, if there is no sensing information previously input before the sensing information, that is, if the sensing information is the first input sensing information, the sensing information is set as the first sensing information and transmitted to the storage unit 230.

Figure 3:
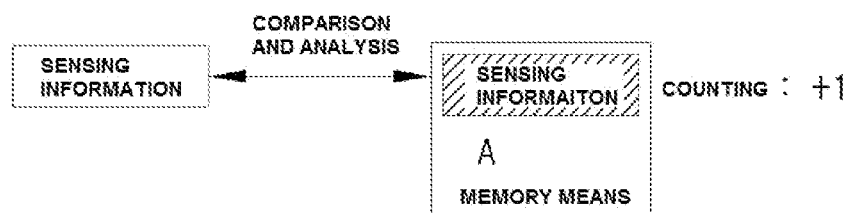
FIG. 3 is an exemplified diagram illustrating an operation process of the signal processing method for sensors of a vehicle according to the exemplary embodiment of the present invention.
Figure 3:
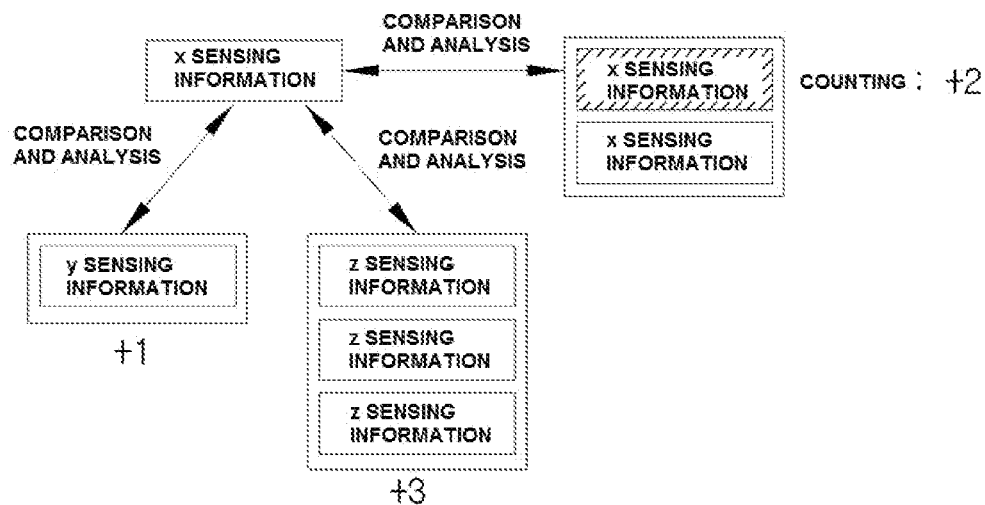

At this time, the storage unit 230 is configured to include a plurality of memory means (or buffer means; however, in the signal processing system and the signal processing method for sensors of a vehicle according to the exemplary embodiment of the present invention, they are collectively expressed by a memory means), and as shown in FIG. 3A, if the first sensing information, which is the sensing information first input through the comparison and arithmetic unit 220, is transmitted, the storage unit 230 selects one of the plurality of memory means and stores the first sensing information which is the first input sensing information.

If the first sensing information, which is the first input sensing information, is transmitted, it means that no sensing information is input to any of the plurality of memory means, and therefore it is preferable that one selected memory means is designated at random.

According to the determination result of the comparison and arithmetic unit 220, if it is determined that the sensing information is previously input before the sensing information, that is, the sensing information is not the first input sensing information but newly input sensing information, the comparison and arithmetic unit 220 may compare and analyze whether the newly input sensing information matches the previously input sensing information.

Here, it is preferable that the comparison and arithmetic unit 220 compares and analyzes the newly input sensing information with the previously input sensing information by applying a preset error range. Specifically, since the possibility that the sensing information input through the sensors in the vehicle is input as an integer is almost low, the detection power can be improved by applying the error range therebetween.

The setting of the error range is preferably made in advance at the time of designing the vehicle as described above, but the error range can be changed depending on the user's demand.

In addition, according to a result of comparing and analyzing whether the newly input sensing information matches the previously input sensing information, if there is the sensing information matching the newly input sensing information among the previously input sensing information, the comparison and arithmetic unit 220 sets the sensing information as redundant sensing information and transmits the redundant sensing information to the storage unit 230.

As shown in FIG. 3B, if the redundant sensing information is transmitted through the comparison and arithmetic unit 220, the storage unit 230 selects the memory means, in which the previously input sensing information matching the newly input sensing information is stored, from the plurality of memory means to store the redundant sensing information. That is, the matched (coinciding) sensing information is stored in the same memory means.

At this time, the arithmetic and control unit 200 may use the counter unit 240 to count the number of sensing information stored in each memory means.

That is, as described above, if the matched (coinciding) sensing information is stored in the same memory means due to the redundant sensing information, the number of sensing information stored in the corresponding memory means is positive (+) by the counter unit 240.

In this way, if the number of sensing information stored in each memory means counted by the counter unit 240 reaches a preset number, the information output unit 250 outputs the specific sensing information stored in the corresponding memory means as the output information, and transmits the output information to the display unit 300.

Here, the preset number is preferably set in advance at the time of designing the vehicle, but can be changed depending on the user's demand. However, in the case of outputting the in-vehicle sensing information, the in-vehicle sensing information is main information in driving a vehicle, and therefore preferably maintains to be preset at the time of designing the vehicle rather than the operation of the driver.

In addition, when the specific sensing information is set as the output information and transmitted to the display unit 300 through the operation of the information output unit 250, the arithmetic and control unit 200 controls the storage unit 230 to reset the remaining memory means other than the memory means in which the specific sensing information set as the output information is stored.

In other words, according to the result of comparing and analyzing the sensing information, the arithmetic and control unit 200 discriminates the specific sensing information, which is set as the output information, as the normal sensing information, and outputs the normal sensing information to update information, and since it is preferable that the subsequently input sensing information is newly compared and analyzed based on the updated information, the arithmetic and control unit 200 resets the remaining memory means other than the memory means in which the specific sensing information is stored to delete the stored sensing information, such that the newly input sensing information can be continuously and accurately discriminated.

In addition, according to a result of comparing and analyzing whether the newly input sensing information matches the previously input sensing information, if there is no sensing information matching the newly input sensing information among the previously input sensing information, the comparison and arithmetic unit 220 sets the sensing information as the additional sensing information and transmits the additional sensing information to the storage unit 230.

If the additional sensing information which is the sensing information newly input through the comparison and arithmetic unit 220 is transmitted, the storage unit 230 selects a new memory means without the stored sensing information from the plurality of memory means to store the additional sensing information.

Figure 2:
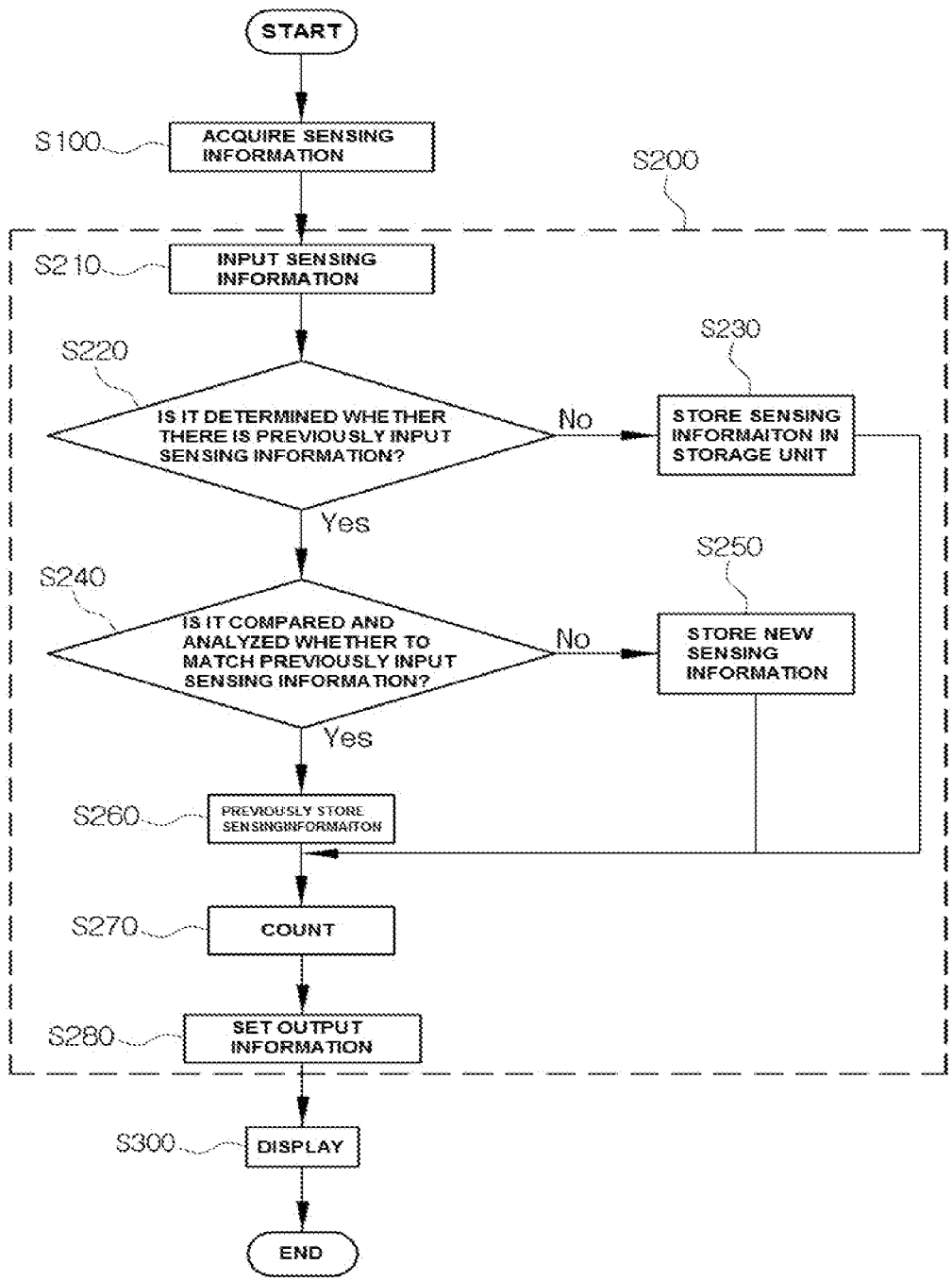
FIG. 2 is a flow chart illustrating a signal processing method for sensors of a vehicle according to an exemplary embodiment of the present invention.

FIG. 2 is a flowchart illustrating a signal processing method for sensors of a vehicle according to an exemplary embodiment of the present invention. The signal processing method for sensors of a vehicle according to the exemplary embodiment of the present invention will be described in detail with reference to FIG. 2.

As shown in FIG. 2, the signal processing method for sensors of a signal according to the exemplary embodiment of the present invention includes a sensing step (S100), an error detection step (S200), and a display step (S300), in which the sensing step (S100), the error detection step (S200), and the display step (S300) transmit/receive information data based on the vehicle communication.

Generally, for the vehicle communication, any of CAN, LIN, PWM, SENT, or the like may be used.

Each step will be described below in detail.

In the sensing step (S100), the vehicle sensor unit 100 may acquire the sensing information through the plurality of sensors previously provided in the vehicle, and transmit the acquired sensing information to the arithmetic and control unit 200.

In the sensing step (S100), the vehicle sensor unit 100 may acquire the sensing information for each sensor every the preset time, and transmit the acquired sensing information to the arithmetic and control unit 200 by a preset number of times or continuously.

In the error detection step (S200), the arithmetic and control unit 200 compares and analyzes the sensing information received for each sensor in the sensing step (S100) to discriminate only the normal sensing information from the sensing information, set the discriminated normal sensing information as the output information, and transmit the set output information to the display unit 300.

In the error detection step (S200), the arithmetic and control unit 200 receives the sensing information for each sensor in the sensing step (S100). Since most of control conditions, such as a monitoring unit, an output unit, an update reference, and an update interval, which are output for each sensor are different, the sensing information for each sensor is separately received.

As shown in FIG. 2, the error detection step (S200) may include an input step (S210), a first determination step (S220), a first storage step (S230), a second determination step (S240), a second storage step (S250), a third storage step (S260), a count step (S270), and an output step (S280).

In the input step (S210), the information input unit 210 receives the sensing information for each sensor in the sensing step (S100), and as described above, separately receives the sensing information for each sensor.

In the first determination step (S220), if the sensing information is input in the input step (S210), the comparison and arithmetic unit 220 determines whether there is the previously input sensing information before the sensing information. That is, it is determined whether the sensing information is the first input sensing information.

In the first storage step (S230), if it is determined as the determination result of the first determination step (S220) that there is no previously input sensing information before the sensing information, that is, the sensing information is the first input sensing information, the comparison and arithmetic unit 220 sets the sensing information as the first sensing information and transmits the first sensing information to the storage unit 230.

If the first sensing information which is the first input sensing information is transmitted through the comparison and arithmetic unit 220, the storage unit 230 selects one of the plurality of memory means to store the first sensing information which is the first input sensing information.

If the first sensing information, which is the first input sensing information, is transmitted, it means that no sensing information is input to any of the plurality of memory means, and therefore it is preferable that one selected memory means is designated at random.

In the second determination step (S240), if it is determined as the determination result of the first determination step (S220) that there is the previously input sensing information, that is, the previously input sensing information is present before the sensing information and thus the sensing information is not the first input sensing information but the newly input sensing information, the comparison and arithmetic unit 220 compares and analyzes whether the newly input sensing information matches the previously input sensing information.

Here, in the second determination step (S240), it is preferable to compare and analyze whether the newly input sensing information matches the previously input sensing information by applying the preset error range. Specifically, since the possibility that the sensing information input through the sensors in the vehicle is input as an integer is almost low, the detection power can be improved by applying the error range therebetween.

The setting of the error range is preferably made in advance at the time of designing the vehicle as described above, but the error range can be changed depending on the user's demand.

In the second storage step (S250), if it is determined as the determination result of the second determination step (S240) that there is previously input sensing information before the sensing information, that is, the sensing information is the first input sensing information, the comparison and arithmetic unit 220 sets the sensing information as the redundant sensing information and transmits the redundant sensing information to the storage unit 230.

When the redundant sensing information is transmitted, the storage unit 230 selects the memory means in which the previously input sensing information matching the newly input sensing information is stored from the plurality of memory means to store the redundant sensing information. That is, the matched (coinciding) sensing information is stored in the same memory means.

In the third storage step (S260), if it is determined as the determination result of the second determination step (S240) that there is no sensing information matching the newly input sensing information from the previously input sensing information, the comparison and arithmetic unit 220 sets the newly input sensing information as the additional sensing information and transmits the additional sensing information to the storage unit 230.

When the additional sensing information is transmitted, the storage unit 230 selects a new memory means without the stored sensing information from the plurality of memory means to store the additional sensing information.

In the count step (S270), the counter unit 240 may count the number of sensing information stored in each of the memory means in the first storage step (S230), the second storage step (S250), and the third storage step (S260) in real time.

In detail, if the matched (coinciding) sensing information is stored in the same memory means due to the redundant sensing information, the number of sensing information stored in the corresponding memory means is positive (+) in the count step 270.

In the output step (S280), if the number of sensing information stored in real time in each of the memory means counted in the count step (S270) reaches a preset number, the information output unit 250 sets the sensing information stored in the corresponding memory means as the output information and transmits the output information.

Here, the preset number is preferably set in advance at the time of designing the vehicle, but can be changed depending on the user's demand. However, in the case of outputting the in-vehicle sensing information, the in-vehicle sensing information is main information in driving a vehicle, and therefore preferably maintains to be preset at the time of designing the vehicle rather than the operation of the driver.

In addition, if the specific sensing information is set as the output information in the output step (S280), the remaining memory means other than the memory means in which the specific sensing information set as the output information is stored is reset.

In other words, in the error detection step (S200), the specific sensing information which is set as the output information is discriminated as the normal sensing information depending on the result of comparing and analyzing the sensing information, and the normal sensing information is output to update information, and since it is preferable that the subsequently input sensing information is newly compared and analyzed based on the updated information, the remaining memory means other than the memory means in which the specific sensing information is stored is reset to delete the stored sensing information, such that the newly input sensing information can be continuously and accurately discriminated.

In the display step S300, the display unit 300 transmits and outputs the output information received in the error detection step S200 to the matched monitoring means among the plurality of monitoring means previously provided in the vehicle, such that the driver (user, manager) can quickly check the state of the vehicle.

For example, if the output information received from the arithmetic and control unit 200 is fuel level information, as the matched monitoring means, a fuel gauge of a main cluster is preferably used, and if the output information is external temperature information, as the matched monitoring means, the center fascia which is the control panel portion or an outside display portion of a cluster is preferably used.

In other words, the signal processing system and the signal processing method for sensors of a vehicle according to an exemplary embodiment of the present invention discriminate noise (error) signals with high accuracy within a short discrimination time and effectively output normal signals by effectively comparing and analyzing input signals (sensing information), thereby increasing integrity and accuracy of the signals which are output to a driver (user, manager).

The signal processing system and the signal processing method for sensors of a vehicle according to the present invention configured as described above can discriminate the abnormal sensing information, that is, the noise signal (error signal) among the sensing information with the high accuracy within the short period of time by comparing and analyzing the sensing information input from the sensors provided in the vehicle.

As a result, it is possible to effectively increase the integrity and accuracy of the information output in the vehicle.

Hereinabove, although the present invention has been described by specific matters such as detailed components, embodiments, and the accompanying drawings, they have been provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to these embodiments, but the claims and all of modifications equal or equivalent to the claims are intended to fall within the scope and spirit of the present invention.

What is claimed is:

1. A signal processing system for a plurality of sensors of a vehicle, comprising:
    a vehicle sensor unit including the plurality of sensors in the vehicle, acquiring sensing information for each sensor of the plurality of sensors at preset time intervals, and transmitting the sensing information by a preset number of times or continuously;
    an arithmetic and control unit
        receiving the sensing information for said each sensor from the vehicle sensor unit,
        comparatively analyzing the received sensing information for said each sensor by applying a preset error range to set specific sensing information as output information and discriminate the specific sensing information as normal sensing information, and
        transmitting the discriminated normal sensing information; and
    a display unit including a plurality of displays in the vehicle, transmitting the output information received from the arithmetic and control unit to, among the plurality of displays, a display associated with the output information, and outputting the output information through the display of the plurality of displays,
wherein
the arithmetic and control unit includes:
    an information input unit receiving the sensing information for said each sensor from the vehicle sensor unit;
    a storage unit;
    a comparison and arithmetic unit
        determining whether there is previously input sensing information when the sensing information is input through the information input unit, and
        immediately transmitting the sensing information to the storage unit when it is determined that the sensing information is first sensing information with no previously input sensing information, or comparatively analyzing whether newly input sensing information matches the previously input sensing information by applying the preset error range when it is determined that there is the previously input sensing information;
    the storage unit including a plurality of memories and storing the first sensing information or the newly input sensing information in one of the plurality of memories selected according to a result of comparative analysis when the first sensing information or the newly input sensing information is transmitted through the comparison and arithmetic unit;
    a counter unit counting the number of sensing information stored in each of the plurality of memories; and
    an information output unit setting the sensing information stored in a corresponding memory of the plurality of memories as the output information and transmitting the output information when the number of sensing information stored in each of the plurality of memories is counted by the counter unit as reaching a preset number,
the sensing information set as the output information by the information output unit is set by the specific sensing information, and
the specific sensing information is discriminated as the normal sensing information, such that the storage unit is controlled to reset the plurality of memories except a memory in which the specific sensing information set as the output information is stored.

2. The signal processing system of claim 1, wherein the comparison and arithmetic unit,
    determines whether there is previously input sensing information when the sensing information is input through the information input unit,
    comparatively analyzes whether newly input sensing information matches the previously input sensing information when it is determined that there is the previously input sensing information, and
    immediately transmits the sensing information to the storage unit when there is the sensing information matching the newly input sensing information among the previously input sensing information, and
the storage unit stores the newly input sensing information in one memory of the plurality of memories in which the previously input sensing information matching the newly input sensing information is stored.

3. The signal processing system of claim 2, wherein the comparison and arithmetic unit determines whether there is previously input sensing information when the sensing information is input through the information input unit, comparatively analyzes whether newly input sensing information matches the previously input sensing information when it is determined that there is the previously input sensing information, and immediately transmits the sensing information to the storage unit when there is no sensing information matching the newly input sensing information among the previously input sensing information, and the storage unit stores the newly input sensing information in a new memory of the plurality of memories.

4. A signal processing method for a plurality of sensors of a vehicle, comprising:

a sensing step of acquiring, by a vehicle sensor unit, sensing information through the plurality of sensors in the vehicle and transmitting the acquired sensing information to an arithmetic and control unit;

an error detection step of comparatively analyzing, by the arithmetic and control unit, the sensing information received for each sensor in the sensing step by applying a preset error range to set specific sensing information as output information and discriminate the specific sensing information as normal sensing information and transmitting the discriminated normal sensing information to a display unit; and a display step of transmitting, by the display unit including a plurality of displays in the vehicle, the output information received in the error detection step to, among the plurality of displays, a display associated with the output information, and outputting the output information, wherein the error detection step includes:
  an input step of inputting the sensing information acquired for said each sensor in the sensing step;
  a first determination step of determining whether there is previously input sensing information when the sensing information is input in the input step;
  a first storage step of storing the sensing information in one memory of a plurality of memories when it is determined as a determination result of the first determination step that the sensing information is first sensing information;
  a second determination step of comparatively analyzing whether newly input sensing information matches the previously input sensing information by applying the preset error range when it is determined as a determination result of the first determination step that there is the previously input sensing information;
  a second storage step of storing newly input sensing information in one of the plurality of memories in which the previously sensing information matching the newly input sensing information is stored when it is determined as a determination result of the second determination step that there is the sensing information matching the newly input sensing information among the previously input sensing information;
  a third storage step of storing the newly input sensing information in a new one of the plurality of memories when it is determined as a determination result of the second determination step that there is no sensing information matching the newly input sensing information among the previously input sensing information;
  a count step of counting the number of sensing information stored in each of the plurality of memories in the first storage step, the second storage step, and the third storage step; and
  an output step of setting sensing information stored in a corresponding memory of the plurality of memories as the output information and transmitting the output information when the number of sensing information stored in each of the plurality of memories is counted as reaching a preset number in the count step, and the sensing information set as the output information in the output step is set by the specific sensing information, and the specific sensing information is discriminated as the normal sensing information, such that the storage unit is controlled to reset the plurality of memories except a memory in which the specific sensing information set as the output information is stored.

* * * * *